(12) United States Patent
Yang et al.

(10) Patent No.: US 9,317,647 B2
(45) Date of Patent: Apr. 19, 2016

(54) METHOD OF DESIGNING A CIRCUIT AND SYSTEM FOR IMPLEMENTING THE METHOD

(71) Applicant: TAIWAN SEMICONDUCTOR MANUFACTURING COMPANY, LTD., Hsinchu (TW)

(72) Inventors: Shyh-Horng Yang, Hsinchu (TW); Chung-Kai Lin, Taipei (TW); Chung-Hsing Wang, Baoshan Township (TW); Kuo-Nan Yang, Hsinchu (TW); Shou-En Liu, Hsinchu (TW); Jhong-Sheng Wang, Taichung (TW); Tan-Li Chou, Zhubei (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 177 days.

(21) Appl. No.: 14/231,200

(22) Filed: Mar. 31, 2014

(65) Prior Publication Data

US 2015/0278427 A1    Oct. 1, 2015

(51) Int. Cl.
*G06F 17/50* (2006.01)
(52) U.S. Cl.
CPC .................................. *G06F 17/5081* (2013.01)
(58) Field of Classification Search
CPC ............ G06F 17/5081; G06F 17/5009; G06F 17/5045
USPC .......................................................... 716/132
See application file for complete search history.

(56) References Cited

U.S. PATENT DOCUMENTS

| 2006/0279349 | A1 | 12/2006 | Grudin et al. |
| 2013/0298101 | A1* | 11/2013 | Chandra ........................ 716/136 |
| 2014/0129166 | A1* | 5/2014 | Park et al. ........................ 702/64 |

FOREIGN PATENT DOCUMENTS

| TW | I278767 | 4/2007 |
| TW | 200933424 | 8/2009 |
| TW | I344755 | 7/2011 |

OTHER PUBLICATIONS

Office Action dated Oct. 26, 2015 from corresponding No. TW 103145763.

* cited by examiner

*Primary Examiner* — Suchin Parihar
(74) *Attorney, Agent, or Firm* — Hauptman Ham, LLP

(57) ABSTRACT

A method of designing a circuit includes receiving a circuit design, and determining a temperature change of at least on back end of line (BEOL) element of the circuit design. The method further includes identifying at least one isothermal region within the circuit design; and determining, using a processor, a temperature increase of at least one front end of line (FEOL) device within the at least one isothermal region. The method further includes combining the temperature change of the at least one BEOL element with the temperature change of the at least one FEOL device, and comparing the combined temperature change with a threshold value.

20 Claims, 8 Drawing Sheets

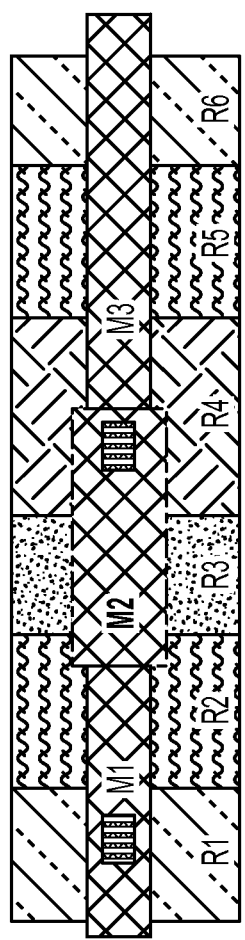
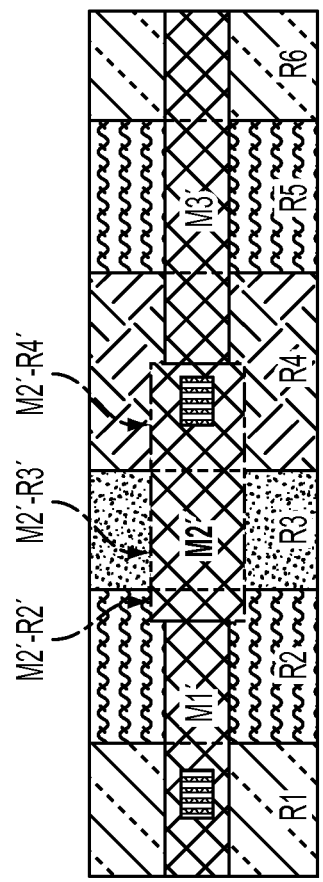
FIG. 3A
FIG. 3B

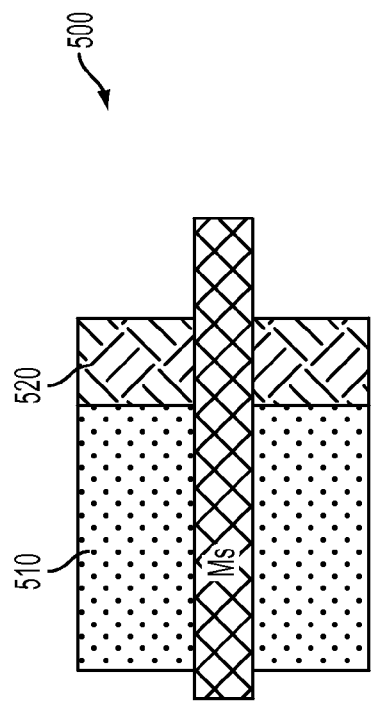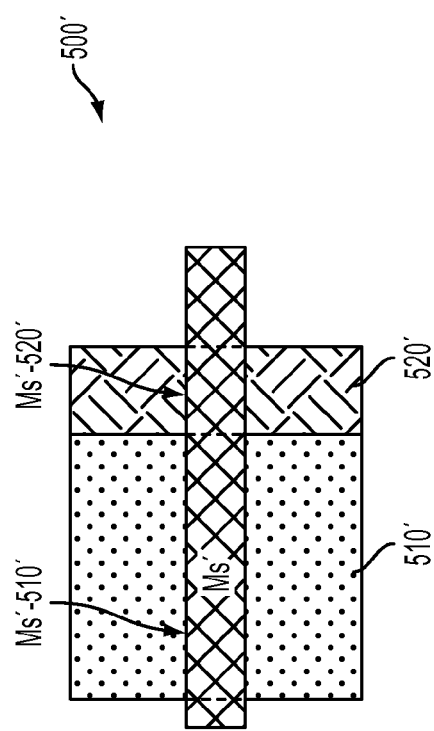

ved heat generated during operation of the circuit. In some approaches, heat considerations focus on back end of the line (BEOL) elements, such as conductive lines and vias in an interconnect structure. An amount of heat generated during operation of the interconnect structure is dependent on a resistance of the conductive lines and vias and a current passing through the conductive lines and vias. The resistance of the conductive lines and vias is a function of a material resistance and a cross-sectional dimension of the conductive lines and vias.

METHOD OF DESIGNING A CIRCUIT AND SYSTEM FOR IMPLEMENTING THE METHOD

BACKGROUND

Circuit designs account for heat generated during operation of the circuit. In some approaches, heat considerations focus on back end of the line (BEOL) elements, such as conductive lines and vias in an interconnect structure. An amount of heat generated during operation of the interconnect structure is dependent on a resistance of the conductive lines and vias and a current passing through the conductive lines and vias. The resistance of the conductive lines and vias is a function of a material resistance and a cross-sectional dimension of the conductive lines and vias.

Conductive lines used to interconnect various elements in a circuit are subject to electro-migration. Electro-migration is movement of elements which form the conductive line due to a current passing through the conductive line. As a temperature of the conductive line or via increases, a rate of electro-migration increases.

A root mean squared current ($I_{RMS}$) is calculated based on power requirements for the circuit and is set as the current passing through the conductive lines and vias in order to estimate an amount of heat generated by the BEOL elements. In some approaches, a look up table or simulation is used to determine the amount of heat generated by the BEOL elements based on the resistance and the $I_{RMS}$. Spacing between various BEOL elements is adjusted based on the amount of heat generated by the BEOL elements to prolong an operation life of the circuit. Addition of active or passive heat sinks is also determined based on the amount of heat generated by the BEOL elements.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3A is a top view of a chip in accordance with some embodiments.

FIG. 3B is a top view of a chip in accordance with some embodiments.

FIG. 5A is a top view of a static random access memory (SRAM) device in accordance with some embodiments.

FIG. 5B is a top view of an SRAM device in accordance with some embodiments.

DETAILED DESCRIPTION

Figure 1:
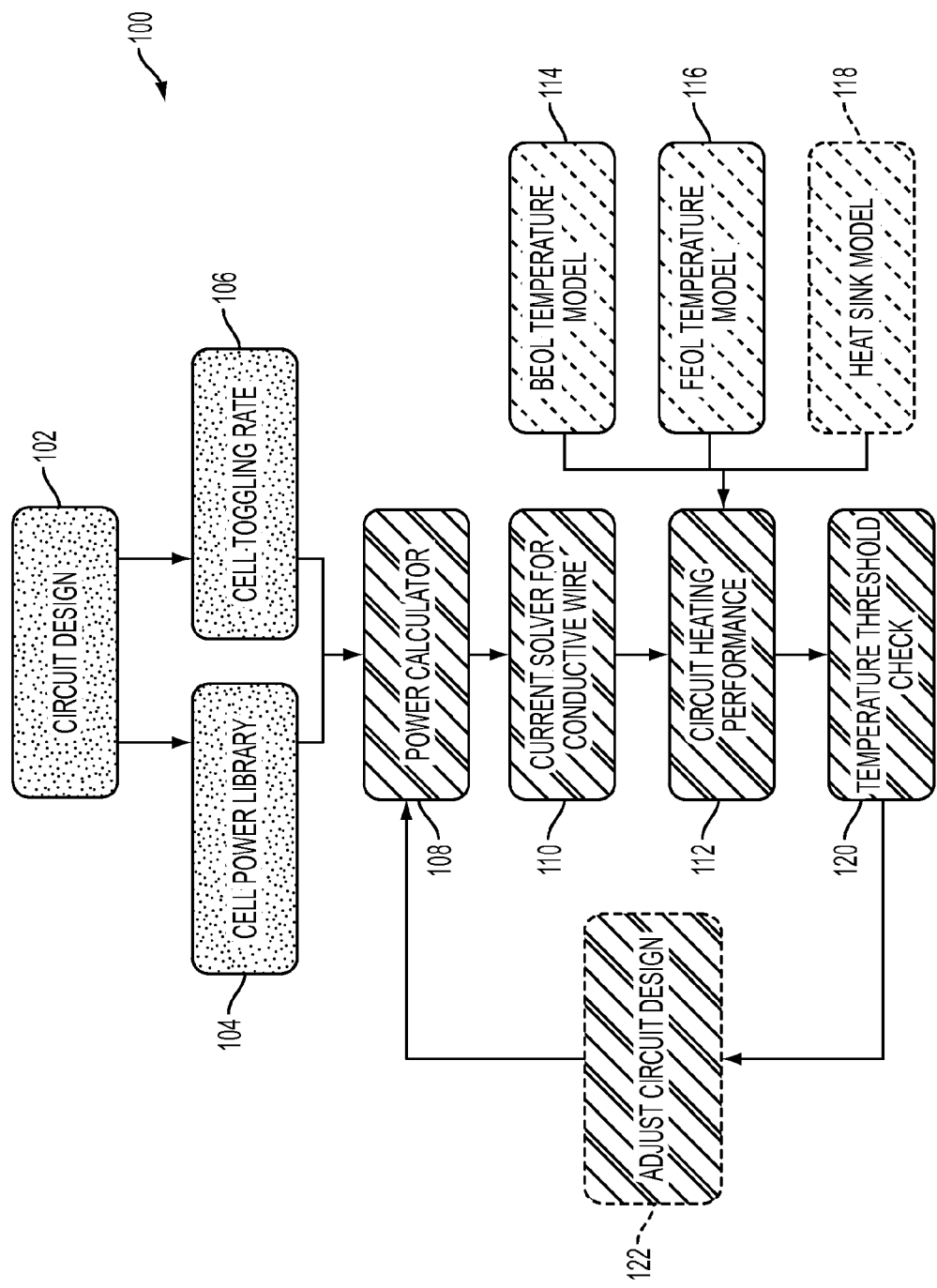
FIG. 1 is a flow chart of a method of designing a circuit using front end of line (FEOL) device temperature in accordance with some embodiments.

The following disclosure provides many different embodiments, or examples, for implementing different features of the provided subject matter. Specific examples of components and arrangements are described below to simplify the present disclosure. These are, of course, examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a flow chart of a method 100 of designing a circuit using front end of line (FEOL) device temperature in accordance with some embodiments. Method 100 begins with operation 102 in which a circuit design is received. The circuit design includes a description of a circuit to be formed. The circuit design includes FEOL devices, such as transistors, resistors, or other suitable FEOL devices. The circuit design further includes back end of line (BEOL) elements, such as conductive lines, conductive vias, capacitors, or other suitable BEOL elements, connected to the FEOL devices.

In some embodiments, the circuit design is received from a customer, or another external source. In some embodiments, the circuit design is received from a circuit designer. In some embodiments, the circuit design includes a schematic diagram of a circuit. In some embodiments, the circuit design includes a text file. In some embodiments, the circuit design includes a graphic file.

In operation 104, a cell power library is used in combination with the circuit design of operation 102 to determine an amount of power consumed by the circuit design. The cell power library includes information related to an amount of power consumed by various FEOL devices and BEOL elements within standard cells which make up the circuit design. The amount of power consumed is determined based on performance specifications of the circuit design.

In some embodiments, the cell power library includes a look-up table. In some embodiments, the cell power library includes equations for calculating power consumption.

In operation 106, a toggling rate for each cell in the circuit design is determined. The toggling rate is a rate at which transistors within a cell transition from a conductive state to a non-conductive state. The toggling rate is determined based on performance specifications of the circuit design. As the toggling rate increases, an amount of power consumed also increases.

The toggling rate and power consumption of a standard cell are combined in a power calculator in operation 108. The power calculator determines an overall amount of power consumed in order to operate the circuit design according to the performance specifications.

In operation 110, a current provided to various FEOL devices and BEOL elements of the circuit design is determined. The current is determined based on the toggling rate of the cells, an operating voltage level of the FEOL devices and BEOL elements, or other suitable performance specifications. In some embodiments, a root mean square current ($I_{RMS}$) for the BEOL elements is determined.

In operation 112, heating performance of the circuit design is determined. The heating performance is determined based on a determined BEOL temperature model from operation 114 and a determined FEOL temperature model from operation 116. The BEOL temperature model is combined with the FEOL temperature model to determine an overall heating performance of the circuit design. In some embodiments, the heating performance of the circuit design is further determined based on a determined heat sink model from optional operation 118. In some embodiments where no heat sink is included in the circuit design, operation 118 is omitted and the heating performance of the circuit design does not include information from the heat sink model.

In operation 114, the BEOL temperature model is determined based on the current provided to the BEOL elements and a resistivity of the BEOL elements. The BEOL temperature model determines an amount of heat generated by passing the current through the BEOL element. Heat contributed by FEOL devices is ignored in determining the BEOL temperature model. In some embodiments, the BEOL temperature model is determined using a modeling equation. In some embodiments, the BEOL temperature model is determined using a look-up table.

In some embodiments, the BEOL temperature model assumes a uniform resistivity for each BEOL element. In some embodiments where uniform resistivity is assumed, the BEOL temperature model determines an amount of heat generated by a BEOL element based on the $I_{RMS}$, a dimension of the BEOL element and the resistivity of the BEOL element. The $I_{RMS}$ is determined in operation 110 based on the performance specifications of the circuit design.

In some embodiments, the dimension of the BEOL element includes a width or cross-sectional area of the BEOL element. In some embodiments, the dimension of the BEOL element is defined by the circuit design. In some embodiments, the dimension of the BEOL element is determined based on the power consumption of the circuit design and the performance specifications of the circuit design.

The resistivity of the BEOL element is determined by a material of the BEOL element. In some embodiments, the material of the BEOL element is defined by the circuit design. In some embodiments, the material of the BEOL element is determined based on the power consumption of the circuit design and the performance specifications of the circuit design. In some embodiments, the material of the BEOL element is determined based on manufacturing processes used to form a circuit based on the circuit design.

In operation 116, the FEOL temperature model is determined based on the current provided to the FEOL devices and a toggle rate of the FEOL devices. The FEOL temperature model determines an amount of heat generated by passing the current through the FEOL device. However, unlike BEOL elements which remain in a conductive state during an entire period of operation of the circuit, in some embodiments, FEOL devices switch between conductive and non-conductive states. An FEOL device in a non-conductive state generates little heat. An FEOL device in a conductive state generates heat based on resistance to the current through the FEOL device.

An amount of heat generated by the FEOL devices is difficult to determine, so the heat generated by the FEOL devices is ignored during circuit design, in some other approaches. The heat generated by the FEOL devices is ignored in some other approaches in order to avoid time consuming calculations and because an amount of heat contributed by the FEOL devices is small in comparison with heater contributed by BEOL elements. However, as a density of FEOL devices increases, and new FEOL device designs, such as fin field effect transistors (FinFET), are introduced an amount of heat contributed by the FEOL devices is increased relative to the heat contributed by the BEOL elements.

For example, a metal oxide semiconductor (MOS) transistor will generate heat when a current is passed from a source to a drain of the MOS transistor. In low density circuits, the heat generated by the MOS transistor is able to be dissipated through a substrate. However, as the density of MOS transistors increases heat dissipation through the substrate is not sufficient to ignore the heat contributed to the circuit due to operation of the MOS transistor.

In an additional example, a FinFET design reduces an area of the transistor to dissipate heat through the substrate in comparison with planar transistor designs such as a MOS transistor. A channel of a FinFET is located in the fin. Sidewalls and a top surface of the fin are covered by a gate dielectric. As a result, heat dissipation is minimized through the sidewalls and the top surface of the fin. The reduced ability of the FinFET to dissipate heat through the substrate causes a FinFET transistor to contribute an increased amount of heat to the circuit in comparison with planar circuit designs.

In still another example, as the frequency of circuits increases, the toggling rate of the FEOL devices increases. The increase in toggling rate means a higher current is being used to transfer a signal across the FEOL device, so that the signal can be sufficiently transferred in a shorter amount of time. The increase in current also increases an amount of heat generated by the FEOL device.

In other approaches which consider heat contributions from FEOL devices, a finite elements method (FEM) or finite difference method (FDM) calculation system is used to determine the heat contribution from the FEOL devices. The FEM or FDM calculation system are time consuming which increases an amount of time used to design the circuit. Repeated iteration and revision of a circuit design exacerbate the lengthy process of FEM or FDM calculation systems. In contrast, the FEOL temperature model of operation 116 provides a faster process for accounting for heat generated by FEOL devices.

In some embodiments, the FEOL temperature model determines a temperature increase of an FEOL device based on a single FEOL device. The temperature increase from the single FEOL device depends on a number of fins or fingers in the FEOL device. In some embodiments, the FEOL temperature model determines the temperature increase of the single FEOL device using a look-up table. In some embodiments, the information in the look-up table is determined using a simulation. In some embodiments, the information in the look-up table is determined using empirical data from experiments. In some embodiments, the FEOL temperature model is simplified by assuming that a temperature change for the single FEOL device is proportional to a power provided to the single FEOL device. This assumption reduces a number of simulations used to determine performance of the single FEOL for a variety of current levels and operating voltage levels. In some embodiments, the temperature increase associated with the single FEOL device is stored in a cell library, such as the cell power library used in operation 104.

In some embodiments, the FEOL temperature model determines the temperature increase of an FEOL device based on a standard cell framework. In some embodiments, the FEOL temperature model determines the temperature increase of the FEOL device based on an entire standard cell. In some embodiments, the FEOL temperature model determines the temperature increase of the FEOL device based on less than the entire standard cell.

A standard cell includes at least one isothermal region. In steady state, the standard cell has several different temperatures since the standard cell includes different FEOL devices that have different toggle rate, different fin numbers or different finger numbers, in some embodiments.

Figure 2:
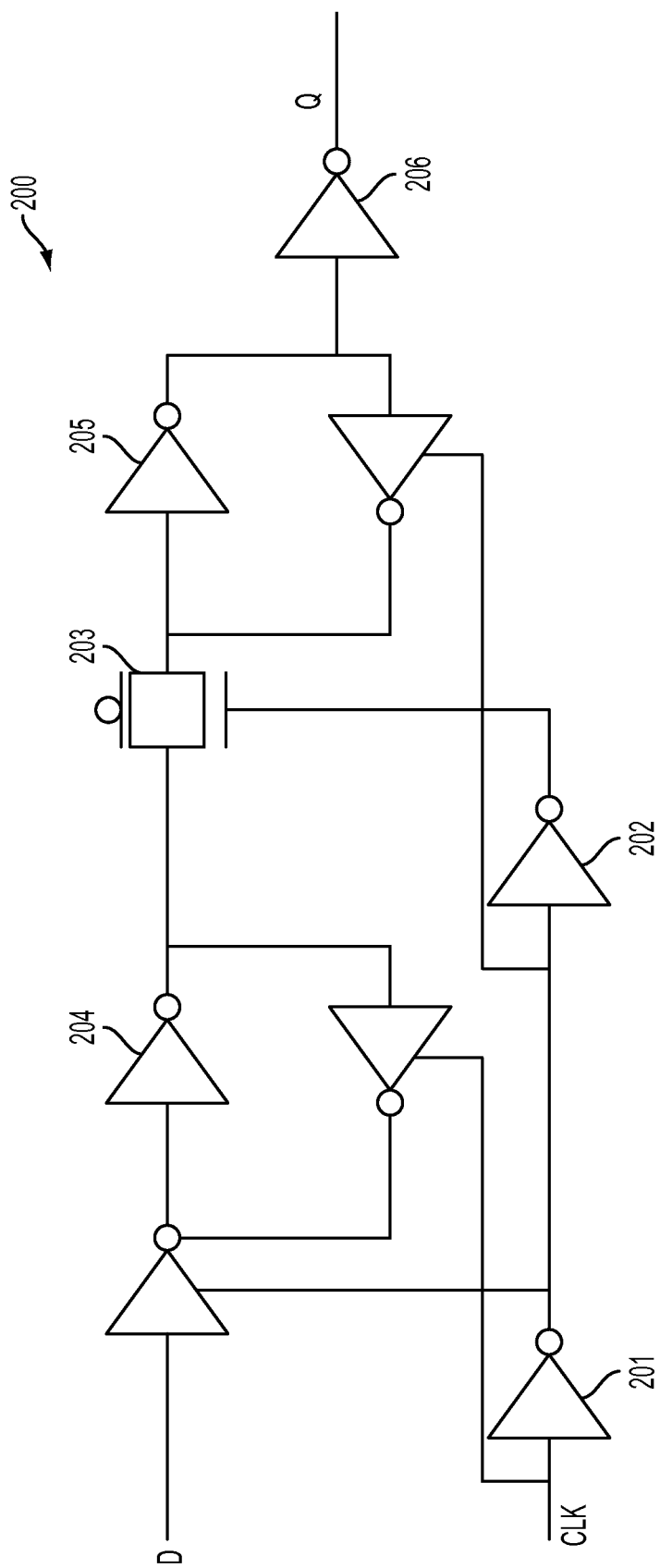
FIG. 2 is a schematic diagram of an exemplary circuit in accordance with some embodiments.

FIG. 2 is a schematic diagram of an exemplary circuit 200 in accordance with some embodiments. Circuit 200 includes various inverters and a transmission gate. A structure of circuit 200 is not discussed in detail for the sake of brevity because the circuit is used to provide an example of different toggle rates. For the purpose of this example, FEOL devices in each of the inverters and transmission gate are considered to have a same structure, i.e., number of fingers or fins, and a same material. When a clock input CLK transitions from a first logic state to a second logic state, but a data input D remains constant; FEOL elements in an inverter 201 and an inverter 202 of circuit 200 transition from one conductive state to another. When a clock input CLK transitions from the first logic state to the second logic state, and the data input D transitions from the first logic state to the second logic state; FEOL elements in an inverter 201 and an inverter 202 of circuit 200 transition from one conductive state to another. In addition, gates in inverters 204-206 as well as a transmission gate 203 transition from one conductive state to another. Based on this example, FEOL devices in inverters 201 and 202 have a higher toggle rate than FEOL devices in transmission gate 203 or inverters 204-206. As a result, an amount of power consumed and heat generated in inverters 201 and 202 will be higher than in transmission gate 203 or inverters 204-206.

In some embodiments, each region of the standard cell which has a same temperature is called an isothermal region. In some embodiments, each region of the standard cell which has a temperature within a threshold range of another region of the standard cell is called an isothermal region. For example, a p-type MOS (PMOS) and an n-type MOS (NMOS) of an inverter are capable of having different temperatures. Also, a complex digital flip-flop is capable of including many isothermal regions, e.g., clock inverters, output stages, latches, or other standard cell components. In some embodiments, a standard cell is assumed to have one isothermal region. Assuming a standard cell has a single isothermal region decreases computation time for designing a circuit, but decreases accuracy in determining an actual heating performance of the circuit.

In some embodiments which include a standard cell having a single isothermal region, a representative FEOL device is identified for use in determining the temperature increase associated with the standard cell. In some embodiments, the representative FEOL device includes, an NMOS combined with a PMOS, a FinFET, a single NMOS or a single PMOS. The temperature increase of the representative FEOL device is determined in a similar manner to determining the temperature change for a single FEOL device described above. In some embodiments, the behavior of the representative FEOL device is stored in a look-up table.

In some embodiments which include a standard cell having multiple isothermal regions, the standard cell is separated into different sub-circuits for the purposes of temperature performance calculations. Each of the sub-circuits is analyzed in a similar manner as a standard cell having a single isothermal region. In some embodiments, the sub-circuit includes a single FEOL device. In some embodiments, the sub-circuit includes a plurality of FEOL devices. As a number of FEOL devices in the sub-circuit increases the amount of computation time is reduced; however, accuracy of the actual temperature performance of the sub-circuit decreases.

In some embodiments, the FEOL temperature model accesses an external file which stores information about a particular sub-circuit. For example, in some embodiments where the sub-circuit includes a single FEOL device, the external file contains information related to a type of FEOL device, such as PMOS, NMOS, FinFET or other FEOL device, along with an equivalent number of fins or fingers of the FEOL device. In some embodiments where the sub-circuit includes a multiple FEOL devices, the external file includes information related to a number of FEOL devices in the sub-circuit, a type of the FEOL devices in the sub-circuit, a set of an equivalent number of fins or fingers for the sub-circuit, or one FEOL equivalent device with an equivalent number of fins or fingers where accuracy may be reduced due to this simplification. In some embodiments, the external file is a standard cell library. In some embodiments, the external file is a look-up table.

In addition to determining isothermal regions within a standard cell, the FEOL temperature model also determines an amount of power provided to each sub-circuit of the standard cell. In some embodiments, the standard cell includes a single sub-circuit. In some embodiments, the standard cell includes multiple sub-circuits. In some embodiments, an amount of power provided to each sub-circuit is determined based on equivalent power de-rating factors. For example, in some embodiments were the sub-circuit includes a single FEOL device, two power de-rating factors are considered. An internal power factor fi and switching power factor fs are used to determine an average power for the single FEOL device. By multiplying the single FEOL device average internal power by fi and the single FEOL device switching power by fs, an equivalent internal and switching power consumed in the single FEOL is able to be determined. In some embodiments, the switching power factor is used to remove a portion of the switching power that is consumed in BEOL elements, but not in the FEOL device.

For example, in an inverter standard cell including a PMOS and an NMOS where each FEOL device is considered to be a sub-circuit, the internal power is assumed to be equal to the switching power, and the PMOS and the NMOS equally share power. By assuming, $fs=fi=\frac{1}{2}$, i.e., half of the internal power goes to the PMOS and the other half of the internal power goes to the NMOS; and half of the switching power goes to the PMOS and the other half of the switching power goes to the NMOS, calculations for the FEOL device are simplified because none of the switching power is consumed by the BEOL elements. The calculations are also simplified because each of the PMOS and the NMOS will have a same temperature increase for a same structure, i.e., same number of fingers, materials, etc.

In some embodiments which include a sub-circuit having a plurality of FEOL devices, the power de-rating factors are applied proportionally to each sub-circuit of the standard cell.

For example, a clock buffer, e.g., two inverters in series, is separable into a first inverter and a second inverter. Each inverter includes one NMOS and one PMOS, and each of the NMOS and the PMOS has 4 fingers and 4 legs. Half of the power supplied to the clock buffer is assumed to be consumed by the first inverter and the other half by the second inverter. As a result, the internal power de-rating factor for the NMOS of the first inverter is ¼, i.e., ¼ for the NMOS of the first inverter and ¼ for the PMOS of the first inverter, so that a total power de-rating factor for the first inverter is ½. The power de-rating factor for the second inverter is similar to the power de-rating factor for the first inverter, so that each inverter has a total power de-rating factor of ½.

In operation 118, the heat sink model determines an amount of heat removed from the circuit by a heat sink. In some embodiments, operation 118 is omitted when no heat sink is present in the circuit. The heat sink model also determines a location of heat removal. In some embodiments, the heat sink model is used to identify a portion of the circuit where a temperature increase within the circuit exceeds a threshold value. In some embodiments, the heat sink model is configured to adjust a size or a location of a heat sink within the circuit based on the BEOL temperature model or the FEOL temperature model. In some embodiments, the location or amount of heat removed from the circuit is determined based on input from the circuit designer.

The output of the BEOL temperature model from operation 114, the output of the FEOL temperature model from operation 116, and the output of the heat sink model from operation 118 are combined to determine the circuit heating performance in operation 112. In some embodiments, the output of the BEOL temperature model is combined with the output of the FEOL temperature model using the standard cell and isothermal regions as described above. In some embodiments, the output of the BEOL temperature model is combined with the output of the FEOL temperature model using weighting factors.

The temperature increase for the BEOL elements is determined based on the material of the BEOL element, dimensions of the BEOL element and a current through the BEOL element. As described above, a look-up table is used to determine the temperature increase from an isothermal region of the standard cell for the FEOL temperature model. A total temperature increase for the BEOL element is impacted by the temperature increase of the FEOL element. For each metal layer of the circuit, the temperature increase of the BEOL element has a different ratio factor ($\alpha$). For example, if the metal layer is directly adjacent to the FEOL device, the ratio factor $\alpha$ is greater than if the metal layer is separated from the FEOL device by one or more metal layers. In some embodiments, the ratio factor $\alpha$ is also determined based on a two-dimensional proximity of the BEOL element to the FEOL device. If the BEOL element is connected to the FEOL device, the ratio factor $\alpha$ is greater than if the BEOL element is spaced from the FEOL device. In addition, a ratio factor $\beta$ for the temperature increase due to the BEOL element's own temperature increase is considered to determine the total temperature increase of the BEOL element. In some embodiments, the total temperature increase for the BEOL element is determined based on equation (1):

$$\Delta T_{BEOL} = \alpha * \Delta T_{FEOL} + \beta * T_{BEOL,SH} \qquad (1)$$

where $\Delta T_{FEOL}$ is the temperature increase of the FEOL device determined by the FEOL temperature model; $\Delta T_{BEOL,SH}$ is the BEOL element's own temperature increase; $\alpha$ is the ratio factor based on the spatial relationship between the FEOL device and the BEOL element; and $\beta$ is the ratio factor for the BEOL element's own temperature increase.

In some embodiments where the standard cell includes more than one isothermal region, each of these isothermal regions impacts the total temperature change of the BEOL elements. In some embodiments, a total temperature increase associated with the FEOL devices is determined by a sum of the temperature increase from each of the isothermal regions. In some embodiments, the total temperature increase associated with the FEOL devices is determined by a weighted sum of the temperature increase from each of the isothermal regions. The weighting factors for the weighted sum are determined based on distance between a respective isothermal region and the BEOL element, similar to the ratio factor $\alpha$ described above. The total temperature increase associated with the FEOL device is then included in equation (1) as $\Delta T_{FEOL}$.

In operation 120, a temperature threshold check determines whether the total temperature increase in the BEOL element exceeds a threshold value. In some embodiments, the temperature threshold check analyzes the BEOL element as a whole. In some embodiments, the temperature threshold check analyzes the BEOL element based on a proximity to different standard cells or isothermal regions. In some embodiments, the temperature threshold check determines an average temperature change of the BEOL element and compares the average temperature change with the threshold value to determine whether to adjust the circuit design. In some embodiments, the temperature threshold check determines a maximum temperature change value and compares the maximum temperature change value with the threshold value to determine whether to adjust the circuit design. In some embodiments, the temperature threshold check determines the temperature change only in a portion of the BEOL element and compares the temperature change in only the portion of the BEOL element to determine whether to adjust the circuit design associated with that portion of the BEOL element.

FIG. 3A is a top view of a chip 300 in accordance with some embodiments. Chip 300 includes six standard cells R1-R6, with each standard cell including one isothermal region. Each standard cell R1-R6 includes at least one FEOL device. In some embodiments, chip 300 includes more or less than six standard cells. In some embodiments, at least one standard cell in chip 300 includes more than one isothermal region. A first BEOL element M1 extends above standard cells R1 and R2. A second BEOL element M2 extends over standard cells R2, R3 and R4. A third BEOL element M3 extends over standard cells R4, R5 and R6.

The temperature threshold check determines a total temperature change associated with each of first BEOL element M1, second BEOL element M2 and third BEOL element M3. In some embodiments where the temperature threshold check determines the total temperature based on a maximum temperature change value, the temperature check compares the temperature change associated with each of the standard cells R1-R6. For example, if a temperature change associated with standard cell R2 is greater than a temperature change associated with standard cell R3 and also greater than a temperature change associated with standard cell R4, then equation (1) for second BEOL element M2 is $\Delta T_{BEOL(M2)} = \alpha * \Delta T_{FEOL(R2)} + \beta * \Delta T_{BEOL,SH(M2)}$. In some embodiments where the temperature threshold check determines the total temperature based on an average temperature change, then equation (1) for second BEOL element M2 is $\Delta T_{BEOL(M2)} = \alpha * \Delta T_{FEOL(R2-R4)} +$ $\beta*\Delta T_{BEOL,SH\ (M2)}$. In some embodiments, $\Delta T_{FEOL(R2-R4)}$ is a standard average of the temperture increase associated with standard cells R2-R4. In some embodiments, $\Delta T_{FEOL\ (R2-R4)}$ is a weighted average of the temperature increase associated with standard cells R2-R4. For example, a via 320 connects second BEOL element M2 to standard cell R4. As a result, a weighting factor for standard cell R4 is greater than a weighting factor for standard cell R2 or standard cell R3, in some embodiments.

FIG. 3B is a top view of a chip 300' in accordance with some embodiments. Chip 300' is similar to chip 300. Chip 300 includes similar reference numbers as chip 300 with the prime sign included. In comparison with chip 300, the temperature threshold check for chip 300' is determined based on portions of the BEOL elements. For example, second BEOL M2' is separated into three portions for the purposes of the temperature threshold check. A first portion M2'-R2' is the portion of second BEOL element M2' over standard cell R2'. A second portion M2'-R3' is the portion of second BEOL element M2' over standard cell R3'. A third portion M2'-R4' is the portion of second BEOL element M2' over standard cell R4'. Equation (1) for each of the portions of second BEOL element M2' is:

$$\Delta T_{BEOL(M2'-R2')} = \alpha*\Delta T_{FEOL(R2')} + \beta*\Delta T_{BEOL,SH(M2')};$$

$$\Delta T_{BEOL(M2'-R3')} = \alpha*\Delta T_{FEOL(R3')} + \beta*\Delta T_{BEOL,SH(M2')}; \text{and}$$

$$\Delta T_{BEOL(M2'-R4')} = \alpha*\Delta T_{FEOL(R4')} + \beta*\Delta T_{BEOL,SH(M2')}$$

In some embodiments, the ratio factor $\alpha$ for each of the standard cells R2'-R4' is a same value. In some embodiments, the ratio factor $\alpha$ for at least one of the standard cells R2'-R4' is different from the ratio factor $\alpha$ of at least one other standard cell R2'-R4'.

In operation 122, the circuit design is adjusted. In some embodiments, operation 122 is omitted where the temperature threshold check determines that the temperature change for the circuit design is below the threshold value. In some embodiments, the circuit design is adjusted by altering a spacing distance between elements of the circuit design to reduce an impact of temperature change in one portion of the circuit design from impacting performance of another portion of the circuit design. In some embodiments, the circuit design is adjusted by altering a dimension of a BEOL element. In some embodiment, the dimension of the BEOL element is altered for an entirety of the BEOL element. In some embodiments, the dimension of the BEOL element is altered for less than an entirety of the BEOL element. In some embodiments, only the dimension of a portion of the BEOL element where the temperature change exceeds the threshold value is altered. In some embodiments, the circuit design is adjusted by adding a heat sink, increasing an amount of heat removal of a heat sink or adjusting a location of a heat sink. In some embodiments, the circuit design is adjusted by altering a current provided to at least one FEOL device or BEOL element.

Figure 4:
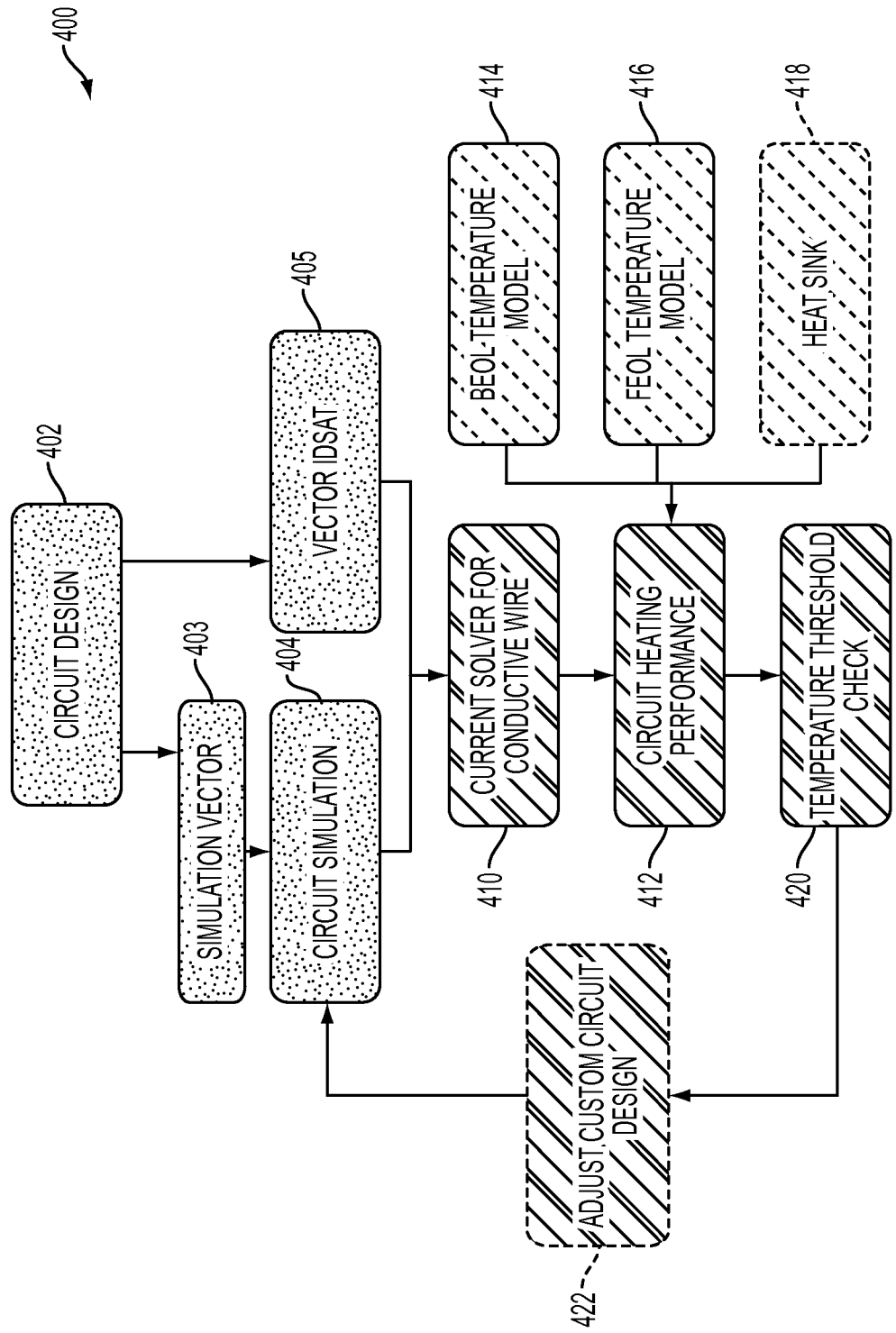
FIG. 4 is a flow chart of a method of designing a custom circuit using FEOL device temperature in accordance with some embodiments.

FIG. 4 is a flow chart of a method of designing a custom circuit using FEOL device temperature in accordance with some embodiments. Method 400 is similar to method 100. Similar operations have a same reference number increased by 300. In comparison with method 100, method 400 is a method of designing a custom circuit. The custom circuit includes at least one element which is not part of a standard cell library. In some embodiments, the custom circuit includes a memory device, such as a 64×256 static random access memory (SRAM) device, or other custom circuit devices. In operation 402, a circuit design is received.

In operation 403, a simulation vector is determined. The simulation vector is a solution for partial differential equations to determine power consumption performance of the circuit design. In some embodiments, the simulation vector is determined using modeling programs, or other suitable computational tools.

In operation 404, a circuit simulation is performed. In contrast with circuits from method 100, power consumption for the custom circuit is difficult to determine using standard cell libraries. Method 400 determines a power consumption of the custom circuit using a circuit simulation. In operation 405, a turn-on current ($I_{dsat}$) vector for various components of the custom circuit is determined. In some embodiments, the $I_{dsat}$ is determined based on parameters provided by the circuit designer. In some embodiments, the $I_{dsat}$ is determined using circuit simulation programs, such as SPICE, or other suitable simulation programs. In contrast with method 100, method 400 associates the turn-on current vector $I_{dsat}$ with each FEOL device in order to help determine a temperature change associated with each FEOL device.

In operation 410, a current provided to various FEOL devices and BEOL elements of the custom circuit is determined. In operation 412, heating performance of the custom circuit is determined. The heating performance is determined based on a determined BEOL temperature model from operation 414 and a determined FEOL temperature model from operation 416. The BEOL temperature model is combined with the FEOL temperature model to determine an overall heating performance of the circuit design. In some embodiments, the heating performance of the custom circuit is further determined based on a determined heat sink model from optional operation 418.

In comparison with operation 110, operation 410 considers the turn on current vector $I_{dsat}$ in determining an operating temperature of the conductive wire. In some embodiments, the turn on current vector $I_{dsat}$ is constant across the custom circuit. In some embodiments, the turn on current vector $I_{dsat}$ varies across the custom circuit. In some embodiments, a maximum turn on current vector $I_{dsat}$ is used to determine the operating temperature of the conductive wire. In some embodiments, an average turn on current vector $I_{dsat}$ is used to determine the operating current of the conductive wire.

In operation 420, a temperature threshold check is performed. FIG. 5A is a top view of a SRAM device 500 in accordance with some embodiments. SRAM device 500 includes a memory array 510 and peripheral circuitry 520. A BEOL element Ms is disposed outside memory array 510 and electrically connected to the memory array and peripheral circuitry 520. The temperature threshold check analyzes an entirety of BEOL Ms in operation 420. Memory array 510 is considered to have a single isothermal region and peripheral circuitry 520 is considered to have a single isothermal region. Further, each of memory array 510 and peripheral circuitry 520 is further considered to have an equivalent fin number or finger number, and an equivalent power de-rating factor, as described above with respect to method 100.

Based on the parameters of memory array 510 and peripheral circuitry 520, an empirical look-up table or equations are usable to determine the temperature change associated with each of the memory array and the peripheral circuitry. The resulting temperature changes are combined in a similar manner as described above with respect to method 100. In some embodiments, a maximum temperature change between memory array 510 and peripheral circuitry 520 is used to determine a total temperature change for BEOL element Ms. In some embodiments, an average temperature change for memory array 510 and peripheral circuitry 520 is used to determine the total temperature change for BEOL element Ms. In some embodiments, a weighted average temperature change for memory array 510 and peripheral circuitry 520 is used to determine the total temperature change for BEOL element Ms.

FIG. 5B is a top view of a SRAM device 500' in accordance with some embodiments. SRAM device 500' is similar to SRAM device 500. SRAM device 500' includes similar reference numbers as SRAM device 500 with the prime sign included. In comparison with SRAM device 500, the temperature threshold check for SRAM device 500' is determined based on portions of the BEOL elements. For example, BEOL element Ms' is separated into two portions for the purposes of the temperature threshold check. A first portion Ms'-510' is the portion of BEOL element Ms' over memory array 510'. A second portion Ms'-520' is the portion of BEOL element Ms' over peripheral circuitry 520'. The temperature threshold check for SRAM device 500' is performed in a similar manner as that described above with respect to chip 300'.

In operation 422, the custom circuit design is adjusted. The custom design is adjusted in a similar manner as the chip design is adjusted in operation 122.

Figure 6:
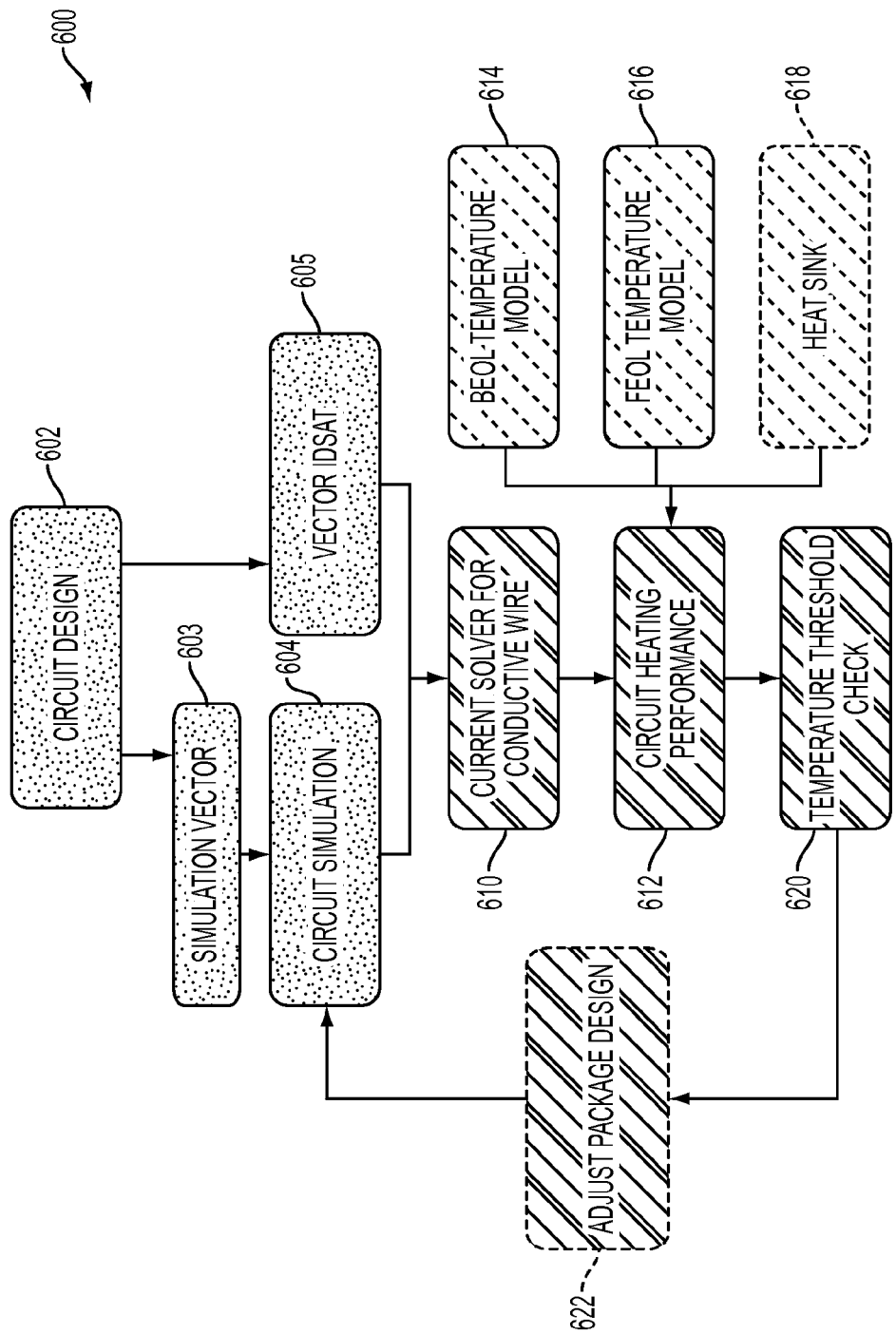
FIG. 6 is a flow chart of a method of designing a package using FEOL device temperature in accordance with some embodiments.

FIG. 6 is a flow chart of a method 600 of designing a package using FEOL device temperature in accordance with some embodiments. Method 600 is similar to method 100. Similar operations have a same reference number increased by 500. In comparison with method 100, method 600 is a method of designing a package. The package includes multiple chips, in some embodiments. In some embodiments, the package is a three-dimensional integrated circuit (3DIC), a monolithic 3DIC or another suitable combination of circuitry. In some embodiments, the package includes BEOL elements connecting distinct chips to one another. In some embodiments, at least one BEOL element of the package is included in an interposer. In operation 602, a circuit design is received.

In operation 603, a simulation vector is determined. The simulation vector is a solution for partial differential equations to determine power consumption performance of the circuit design. In some embodiments, the simulation vector is determined using modeling programs, or other suitable computational tools.

In operation 604, a circuit simulation is performed. In operation 605, a turn-on current ($I_{dsat}$) vector for various components of the circuit design is determined. In some embodiments, the $I_{dsat}$ is determined based on parameters provided by the circuit designer. In some embodiments, the $I_{dsat}$ is determined using circuit simulation programs, such as SPICE, or other suitable simulation programs.

In operation 610, a current provided to various FEOL devices and BEOL elements of the circuit design is determined. In operation 612, heating performance of the circuit design is determined. The heating performance is determined based on a determined BEOL temperature model from operation 614 and a determined FEOL temperature model from operation 616. The BEOL temperature model is combined with the FEOL temperature model to determine an overall heating performance of the circuit design. In some embodiments, the heating performance of the circuit design is further determined based on a determined heat sink model from optional operation 618.

In comparison with operation 110, operation 610 considers a location of the BEOL element with respect to the chip. In some embodiments, the BEOL element is within the chip, such as a through silicon via (TSV), a conductive line which functions as a contact pad, or another suitable BEOL element. In some embodiments, the BEOL element is outside the chip, such as an interposer, an intervening substrate in a monolithic 3DIC, or another suitable BEOL element. In some embodiments, a ratio factor associated with a BEOL element within the chip is higher than a ratio factor associated with a BEOL element outside the chip. The ratio factor is decreased for a BEOL element outside the chip due to the presence of insulating material around the chip, such as a molding compound, underfill material, or other suitable insulating material, in some embodiments.

Figure 7A:
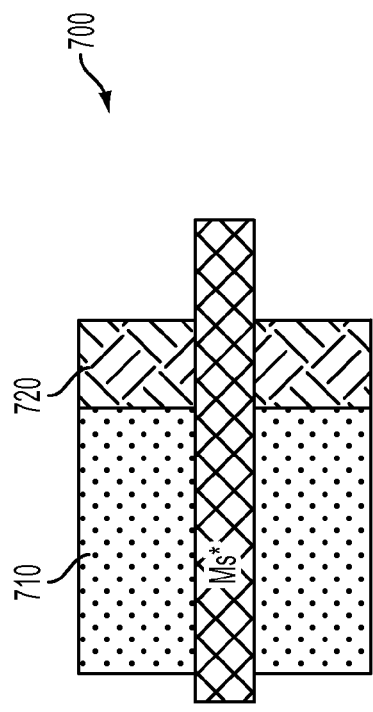
FIG. 7A is a top view of a package in accordance with some embodiments.

In operation 620, a temperature threshold check is performed. FIG. 7A is a top view of a package 700 in accordance with some embodiments. Package 700 includes a chip 710 and peripheral circuitry 720. A BEOL element Ms* is disposed outside chip 710 and electrically connected to the chip and peripheral circuitry 720. The temperature threshold check analyzes an entirety of BEOL Ms* in operation 620. Chip 710 is considered to have a single isothermal region and peripheral circuitry 720 is considered to have a single isothermal region. Further, each of chip 710 and peripheral circuitry 720 is further considered to have an equivalent fin number or finger number, and an equivalent power de-rating factor, as described above with respect to method 100.

Based on the parameters of chip 710 and peripheral circuitry 720, look-up table or equations are usable to determine the temperature change associated with each of the chip and the peripheral circuitry. The resulting temperature changes are combined in a similar manner as described above with respect to method 100. In some embodiments, a maximum temperature change between chip 710 and peripheral circuitry 720 is used to determine a total temperature change for BEOL element Ms*. In some embodiments, an average temperature change for chip 710 and peripheral circuitry 720 is used to determine the total temperature change for BEOL element Ms*. In some embodiments, a weighted average temperature change for chip 710 and peripheral circuitry 720 is used to determine the total temperature change for BEOL element Ms*.

Figure 7B:
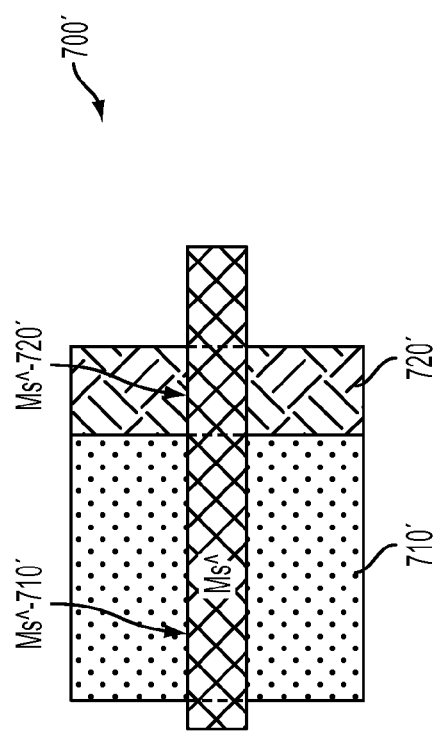
FIG. 7B is a top view of a package in accordance with some embodiments.

FIG. 7B is a top view of a package 700' in accordance with some embodiments. Package 700' is similar to package 700. Package 700' includes similar reference numbers as package 700 with the prime sign included. In comparison with package 700, the temperature threshold check for package 700' is determined based on portions of the BEOL elements. For example, BEOL element Msˆ is separated into two portions for the purposes of the temperature threshold check. A first portion Msˆ-710' is the portion of BEOL element Msˆ over chip 710'. A second portion Msˆ-720' is the portion of BEOL element Msˆ over peripheral circuitry 720'. The temperature threshold check for package 700' is performed in a similar manner as that described above with respect to chip 300'.

In operation 622, the package design is adjusted. The package design is adjusted in a similar manner as the chip design is adjusted in operation 122.

Figure 8:
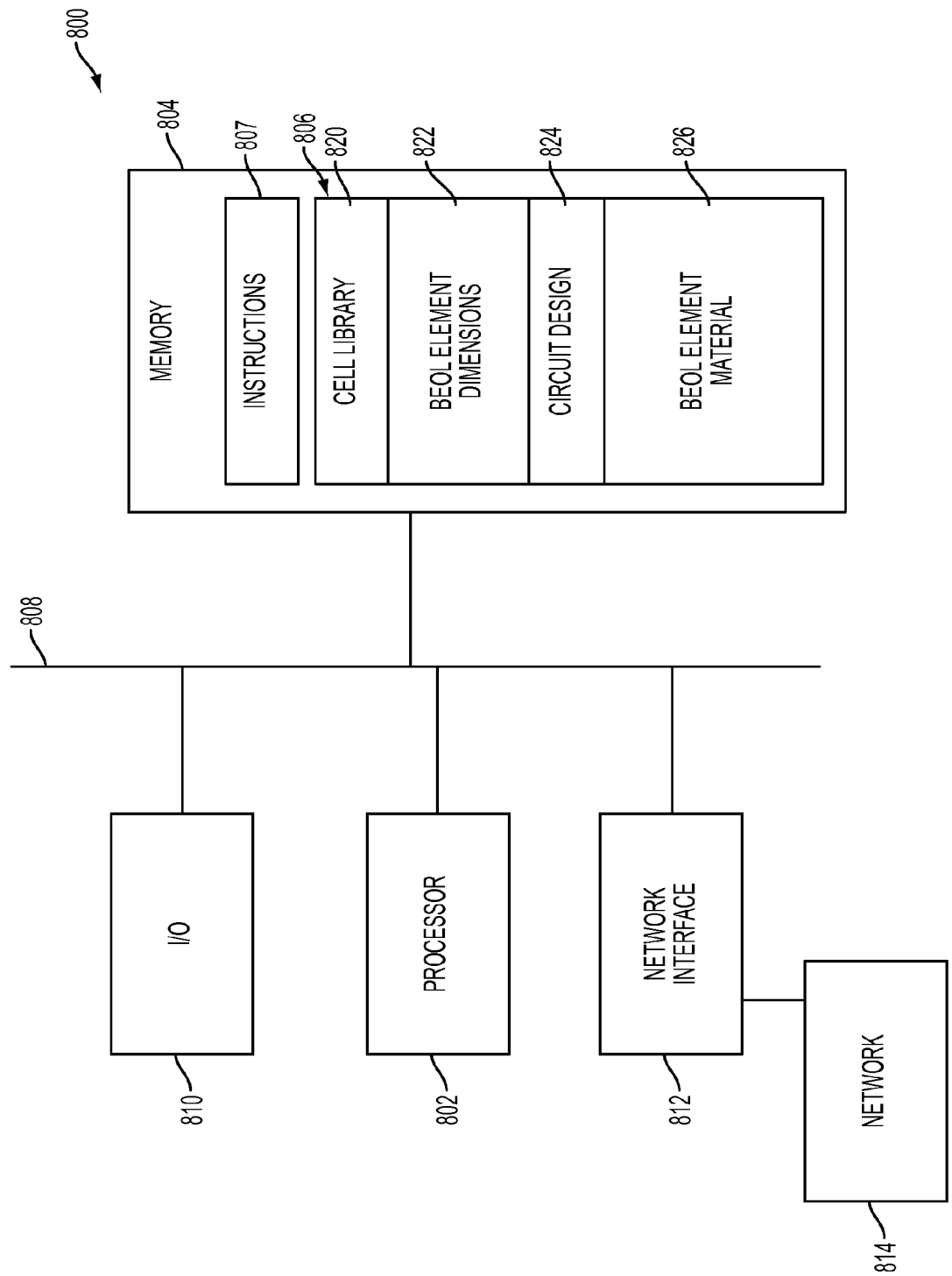
FIG. 8 is a block diagram of a general purpose computing device for implementing design of a circuit in accordance with some embodiments.

FIG. 8 is a schematic view of a system 800 for altering a design for a memory array or executing a production process for either a floating gate memory array or a charge trapping memory array in accordance with one or more embodiments. System 800 includes a hardware processor 802 and a non-transitory, computer readable storage medium 804 encoded with, i.e., storing, the computer program code 806, i.e., a set of executable instructions. Computer readable storage medium 804 is also encoded with instructions 807 for interfacing with manufacturing machines for producing the memory array. The processor 802 is electrically coupled to the computer readable storage medium 804 via a bus 808. The processor 802 is also electrically coupled to an I/O interface 810 by bus 808. A network interface 812 is also electrically connected to the processor 802 via bus 808. Network interface 812 is connected to a network 814, so that processor 802 and computer readable storage medium 804 are capable of connecting to external elements via network 814. The processor 802 is configured to execute the computer program code 806 encoded in the computer readable storage medium 804 in order to cause system 800 to be usable for performing a portion or all of the operations as described in method 100, method 400 or method 600.

In some embodiments, the processor 802 is a central processing unit (CPU), a multi-processor, a distributed processing system, an application specific integrated circuit (ASIC), and/or a suitable processing unit.

In some embodiments, the computer readable storage medium 804 is an electronic, magnetic, optical, electromagnetic, infrared, and/or a semiconductor system (or apparatus or device). For example, the computer readable storage medium 804 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 804 includes a compact disk-read only memory (CD-ROM), a compact disk-read/write (CD-R/W), and/or a digital video disc (DVD).

In some embodiments, the storage medium 804 stores the computer program code 806 configured to cause system 800 to perform method 100, method 400 or method 600. In some embodiments, the storage medium 804 also stores information needed for performing a method 100, 400 or 600 as well as information generated during performing the method 100, 400 or 600, such as a cell library parameter 820, a BEOL element dimension parameter 822, a circuit design parameter 824, a BEOL material parameter 826 and/or a set of executable instructions to perform the operation of method 100, 400 or 600.

In some embodiments, the storage medium 804 stores instructions 807 for interfacing with circuit design machines. The instructions 807 enable processor 802 to generate circuit design instructions readable by the circuit design machines to effectively implement method 100, 400 or 600 during a circuit design process.

System 810 includes I/O interface 810. I/O interface 810 is coupled to external circuitry. In some embodiments, I/O interface 810 includes a keyboard, keypad, mouse, trackball, trackpad, and/or cursor direction keys for communicating information and commands to processor 802.

System 800 also includes network interface 812 coupled to the processor 802. Network interface 812 allows system 800 to communicate with network 814, to which one or more other computer systems are connected. Network interface 812 includes wireless network interfaces such as BLUETOOTH, WIFI, WIMAX, GPRS, or WCDMA; or wired network interface such as ETHERNET, USB, or IEEE-1394. In some embodiments, method 100, 400 or 600 is implemented in two or more systems 800, and information such as circuit design, BEOL dimensions, or BEOL material are exchanged between different systems 800 via network 814.

System 800 is configured to receive information related to a cell library through I/O interface 810 or network interface 812. In some embodiments, the cell library is stored in a separate database. The information is transferred to processor 802 via bus 808 to be stored in computer readable medium 804 as cell library parameter 820. System 800 is configured to receive information related to BEOL element dimensions through I/O interface 810 or network interface 812. The information is stored in computer readable medium 804 as BEOL element dimension parameter 822. System 800 is configured to receive information related to a circuit design through I/O interface 810 or network interface 812. The information is stored in computer readable medium 804 as circuit design parameter 824. System 800 is configured to receive information related to BEOL element material through I/O interface 810 or network interface 812. The information is stored in computer readable medium 804 as BEOL element material parameter 826.

During operation, processor 802 executes a set of instructions to determine a temperature change of BEOL elements. In some embodiments, if the temperature change determined by processor exceeds a threshold value, processor 802 executes a set of instructions to adjust a circuit design. In some embodiments, processor 802 executes a set of instructions to prompt a user to adjust the circuit design.

One aspect of this description relates to a method of designing a circuit. The method includes receiving a circuit design, and determining a temperature change of at least on back end of line (BEOL) element of the circuit design. The method further includes identifying at least one isothermal region within the circuit design; and determining, using a processor, a temperature increase of at least one front end of line (FEOL) device within the at least one isothermal region. The method further includes combining the temperature change of the at least one BEOL element with the temperature change of the at least one FEOL device, and comparing the combined temperature change with a threshold value.

Another aspect of this description relates to a method of designing a circuit. The method includes receiving a circuit design, and determining a temperature change of at least on back end of line (BEOL) element of the circuit design, wherein the at least one BEOL element electrically connects a chip and a peripheral circuitry. The method further includes identifying at least one isothermal region within the chip and at least one isothermal region within the peripheral circuitry, and determining, using a processor, a temperature change of the at least one isothermal region within the chip. The method further includes determining a temperature change of the at least one isothermal region within the peripheral circuitry. The method further includes combining the temperature change of the at least one BEOL element with the temperature change of the at least one isothermal region within the chip and the at least one isothermal region within the peripheral circuitry, and comparing the combined temperature change with a threshold value.

Still another aspect of this description relates to a system for designing a circuit. The system includes a processor, and a non-transitory computer readable medium connected to the processor. The processor is configured to execute instructions to determine a temperature change of at least on back end of line (BEOL) element of a circuit design, and identify at least one isothermal region within the circuit design. The processor further configured to execute instructions to determine a temperature increase of at least one front end of line (FEOL) device within the at least one isothermal region. The processor further configured to execute instructions for combine the temperature change of the at least one BEOL element with the temperature change of the at least one FEOL device, and compare the combined temperature change with a threshold value.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein.

Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of designing a circuit, the method comprising:
    determining a temperature change of at least one back end of line (BEOL) element of a circuit design;
    identifying at least one isothermal region within the circuit design;
    determining, using a processor, a temperature increase of at least one front end of line (FEOL) device within the at least one isothermal region;
    combining the temperature change of the at least one BEOL element with the temperature change of the at least one FEOL device; and
    comparing the combined temperature change with a threshold value.

2. The method of claim 1, wherein determining the temperature change of the at least one FEOL device comprises determining a temperature change of each FEOL device of a plurality of FEOL devices.

3. The method of claim 2, wherein combining the temperature change of the at least one BEOL element with the temperature change of the at least one FEOL device comprises:
    comparing the temperature change of each FEOL device of the plurality of FEOL devices;
    determining a maximum temperature change based on the comparison; and
    combining the temperature change of the at least one BEOL element with the maximum temperature change.

4. The method of claim 2, wherein combining the temperature change of the at least one BEOL element with the temperature change of the at least one FEOL device comprises:
    averaging the temperature change of each FEOL device of the plurality of FEOL devices; and
    combining the temperature change of the at least one BEOL element with the average temperature change.

5. The method of claim 2, wherein combining the temperature change of the at least one BEOL element with the temperature change of the at least one FEOL device comprises:
    determining a weighted average temperature change of each FEOL device of the plurality of FEOL devices; and
    combining the temperature change of the at least one BEOL element with the weighted average temperature change.

6. The method of claim 5, wherein determining the weighted average temperature change comprises multiplying the temperature change of each FEOL device of the plurality of FEOL devices by a weighting factor, where the weighting factor is based on a distance between the at least on BEOL element and a respective FEOL device of the plurality of FEOL devices.

7. The method of claim 1, wherein identifying the at least one isothermal region comprises identifying a portion of a standard cell where each FEOL device of the at least one FEOL device have a same temperature change.

8. The method of claim 1, wherein identifying the at least one isothermal region comprises identifying a portion of a standard cell where each FEOL device of the at least one FEOL device have a temperature change within a pre-determined range.

9. The method of claim 1, wherein determining the temperature change of the at least one FEOL device comprises determining the temperature change based on a number of fingers of the at least one FEOL device, a number of fins of the at least one FEOL device or a toggling rate of the at least one FEOL device.

10. The method of claim 1, further comprising adjusting the circuit design if the combined temperature change exceeds the threshold value.

11. The method of claim 10, wherein adjusting the circuit design comprises adding a heat sink, altering an amount of heat removed by the heat sink, altering a location of the heat sink, altering a spacing between the at least one FEOL device and the at least one BEOL element, or altering a dimension of the at least the BEOL element.

12. The method of claim 10, wherein adjusting the circuit design comprises altering a dimension of a portion of the at least one BEOL element.

13. The method of claim 12, wherein altering the dimension of the portion of the at least one BEOL element comprises altering a dimension of less than an entirety of the at least one BEOL element.

14. The method of claim 1, wherein combining the temperature change of the at least one BEOL element with the temperature change of the at least one FEOL device comprises:
    combining a temperature change of a first portion of the at least one BEOL element with a temperature change of a first FEOL device; and
    combining a temperature change of a second portion of the at least one BEOL element with a temperature change of a second FEOL device different from the first FEOL device.

15. The method of claim 1, wherein determining the temperature change of the at least one FEOL device comprises determining a temperature change of a fin field effect transistor (FinFET).

16. The method of claim 1, wherein combining the temperature change of the at least one BEOL element with the temperature change of the at least one FEOL device further comprises combining the temperature change of the at least one BEOL element with a temperature change of a heat sink.

17. A method of designing a circuit, the method comprising:
    determining a temperature change of at least one back end of line (BEOL) element of a circuit design, wherein the at least one BEOL element electrically connects a chip and a peripheral circuitry;
    identifying at least one isothermal region within the chip and at least one isothermal region within the peripheral circuitry;
    determining, using a processor, a temperature change of the at least one isothermal region within the chip;
    determining a temperature change of the at least one isothermal region within the peripheral circuitry
    combining the temperature change of the at least one BEOL element with the temperature change of the at least one isothermal region within the chip and the at least one isothermal region within the peripheral circuitry; and
    comparing the combined temperature change with a threshold value.

18. The method of claim 17, wherein determining the temperature change of the at least one BEOL element comprises determining the temperature change of the at least one BEOL element within the chip.

19. The method of claim 17, wherein determining the temperature change of the at least one BEOL element comprises determining the temperature change of the at least one BEOL element outside the chip.

20. A system for designing a circuit, the system comprising:
- a processor; and
- a non-transitory computer readable medium connected to the processor, wherein the processor is configured to execute instructions to:
- determine a temperature change of at least one back end of line (BEOL) element of a circuit design;
- identify at least one isothermal region within the circuit design;
- determine a temperature increase of at least one front end of line (FEOL) device within the at least one isothermal region;
- combine the temperature change of the at least one BEOL element with the temperature change of the at least one FEOL device; and
- compare the combined temperature change with a threshold value.

* * * * *